United States Patent [19]

Gonzalez

[11] 4,390,091
[45] Jun. 28, 1983

[54] MODULAR CONVEYOR GUIDE AND SYSTEM UTILIZING SAME

[75] Inventor: Hector M. Gonzalez, Richmond, Va.

[73] Assignee: Philip Morris Incorporated, New York, N.Y.

[21] Appl. No.: 221,280

[22] Filed: Dec. 30, 1980

[51] Int. Cl.³ .......................................... B65G 37/00
[52] U.S. Cl. .................................. 198/358; 198/437;
  198/570; 198/836; 198/860; 198/572
[58] Field of Search .............................. 198/356–358,
  198/437, 442, 570, 836, 841, 860, 861, 572

[56] References Cited

U.S. PATENT DOCUMENTS 3,236,363 2/1966 Sutliffe .............................. 198/570
3,507,380 4/1970 Sarovich et al. ............... 198/841 X

*Primary Examiner*—Jeffrey V. Nase
*Attorney, Agent, or Firm*—Arthur I. Palmer, Jr.; D. Anthony Gregory

[57] ABSTRACT

A modular conveyor guide comprising first and second end walls and a connecting top wall having first, second and third regions adapted to guide first, second and third conveyors.

43 Claims, 11 Drawing Figures

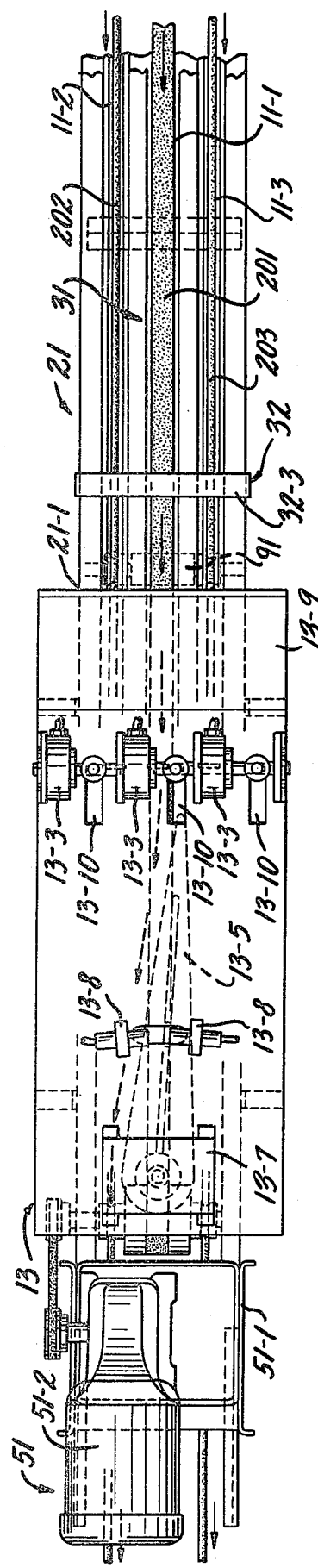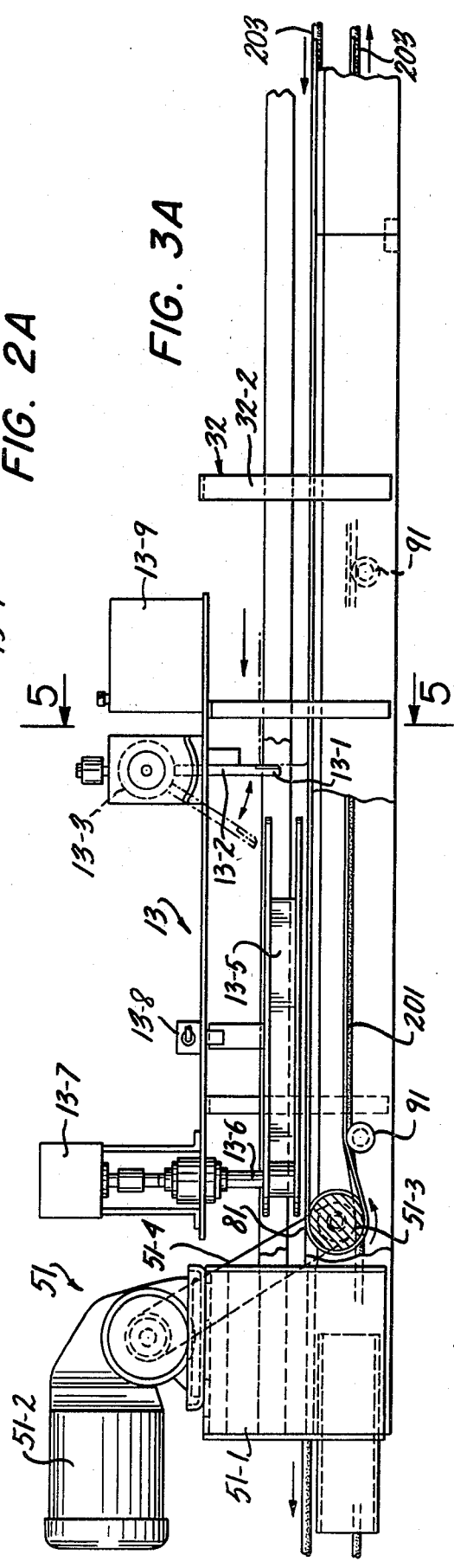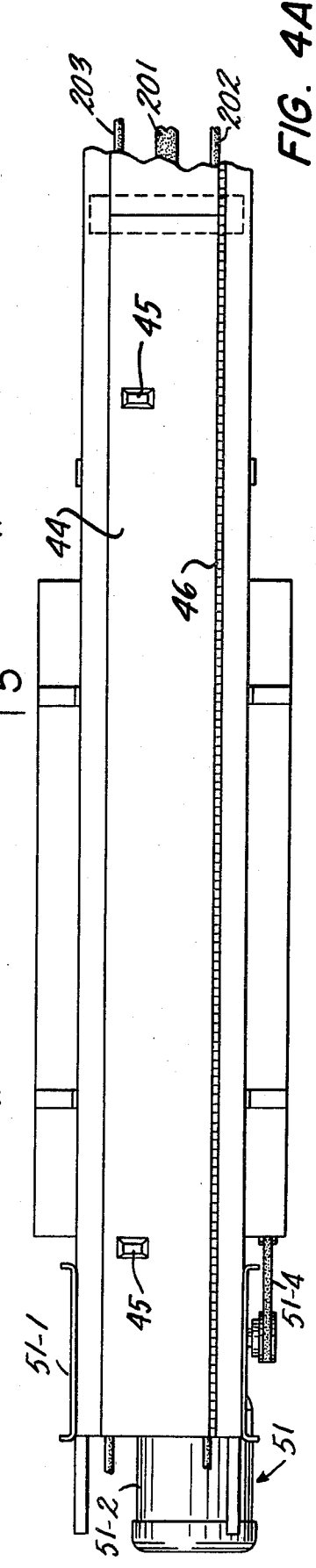

MODULAR CONVEYOR GUIDE AND SYSTEM UTILIZING SAME

BACKGROUND OF THE INVENTION

This invention pertains to the handling of cartons and, in particular, to the packaging of same.

It is customary in many industries to utilize cartons to package individual items or articles. Such is the practice in the cigarette industry wherein cigarette cartons are used to pack individual cigarette packs. Typically, a cigarette carton contains ten cigarette packs arranged in two rows of 5 packs each so that the height, width and length of the cigarette carton are approximately one, two and five times respectively, that of an individual cigarette pack. Once packaged into cigarette cartons, it is further customary to package a large number of cartons into cardboard containers which are used to ship the cartons to distributors for eventual sale to consumers.

In one system for automatically performing the aforementioned packaging of cigarette cartons, first and second carton packers are situated downstream of first and second carton delivery channels which feed the respective packers. Elevators disposed at a number of stations along the channels receive the cartons from automatic cigarette pack packaging machines. These elevators deliver their respective cartons to chutes which feed a third channel situated centrally of the first and second channels. Cartons in the central channel are diverted to one or the other of the first and second channels by traffic controllers disposed downstream of the elevators. In this manner, a substantially even distribution of cartons to the first and second channels, and therefore, their respective packers, is maintained.

In the aforesaid system, the first, second and third channels are each comprised of individual conveyor guides which themselves include segments which are bolted together. The conveyor guides of the first and second channels are of similar configuration and include first and second side walls and a connecting bottom wall. A conveyor support is bolted to the bottom wall and is adapted to carry a nylon encapsulated steel cable conveyor. Such a conveyor enables carton transport with a minimum of friction, thereby avoiding excessive carton damage. The conveyor guide of the third channel is of different construction and is adapted to carry a flat belt conveyor, as compared to the nylon encapsulated cable conveyors of the first and second channels. This type conveyor is required in the third channel in order to permit diverting of the cartons to one or the other of the first and second channels.

As can be appreciated, the aforesaid system is modular in nature, each modular section including an elevator, first, second and third channel segments and a traffic controller. By further including a belt drive for each third channel segment, each module is provided with all that is necessary for conveyance along its third channel segment. Drives for the cable conveyors of the first and second channel segments, on the other hand, are not provided in each modular section. Instead, these cables are strung through several modular sections between corresponding cable drives and cable take-ups.

While the above-described system has been used to successfully package cartons, it has certain drawbacks which if alleviated would make the system more attractive to potential users. Thus, for example, the first, second and third channel segments are formed as separate conveyor guide assemblies, thereby requiring individual placement and alignment. Such placement and alignment is time consuming and may require periodic realignment after the system is operated. Another drawback, is the excessive space required by the three separate conveyor guides. This is further aggrevated by transport of the cartons over the widest carton surface, i.e., the surface defined by the carton length and height dimensions. Finally, the system during loss of operation of the carton packers, ejects further cartons from its respective elevators, and maintains the drives for the third channel belts. Both operations result in carton damage.

It is an object of the present invention to provide a modular conveyor guide which can be more readily assembled and requires less space than the conveyor guides utilized in the above-described carton packaging system.

It is a further object of the present invention to provide a modular conveyor guide which can be more readily adapted to various packaging system requirements and which better provides for preservation of carton condition in the case of system loss of operation.

SUMMARY OF THE INVENTION

In accordance with the principles of the present invention, the above and other objectives are realized through the use of a modular conveyor guide which includes first and second walls and a third or top wall connecting such first and second walls and provided with a first region for guiding a first conveyor and second and third regions on opposite sides of said first region for guiding second and third conveyors. In particular, the first, second and third walls comprise an integral track segment formed by extrusion and the first region is adapted to guide a belt conveyor and the second and third regions are adapted to guide cable conveyors. Rail means cooperate with the regions of the third wall to define corresponding first, second and third channels for carton conveyance.

With the present conveyor guide, the conveyance channels are thus defined by an integral track. This obviates the need to align the channels and simplifies the procedure involved in connecting a number of such conveyor guides in tandem.

In the embodiment of the invention to be described hereinafter, the first region is substantially flat and the second and third regions include two upstanding flanges, one of which for each region connects same to the first region. Furthermore, in the described embodiment, the rail means are situated across the expanse of the three regions such that the second and third channels include a segment of the flat first region for article support.

In further aspects of the invention, each guide conveyor is provided with a sensor for indicating when accumulation in the first channel is beyond a preselected point and with an elevator having provision for article accumulation during system failure. Additional provision is made for a beam assembly for support of the conveyor guide.

BRIEF DESCRIPTION OF THE DRAWINGS

The above and other features and aspects of the present invention will become more apparent upon reading the following detailed description in conjunction with the accompanying drawings, in which:

FIGS. 2A and 2B show plan views of front and rear track segments of the modular guides of FIG. 1;

FIGS. 3A and 3B show side views of front and rear track segments of the modular guides of FIG. 1;

FIGS. 4A and 4B show bottom views of front and rear track segments of the modular guides of FIG. 1;

DETAILED DESCRIPTION

Figure 1A:
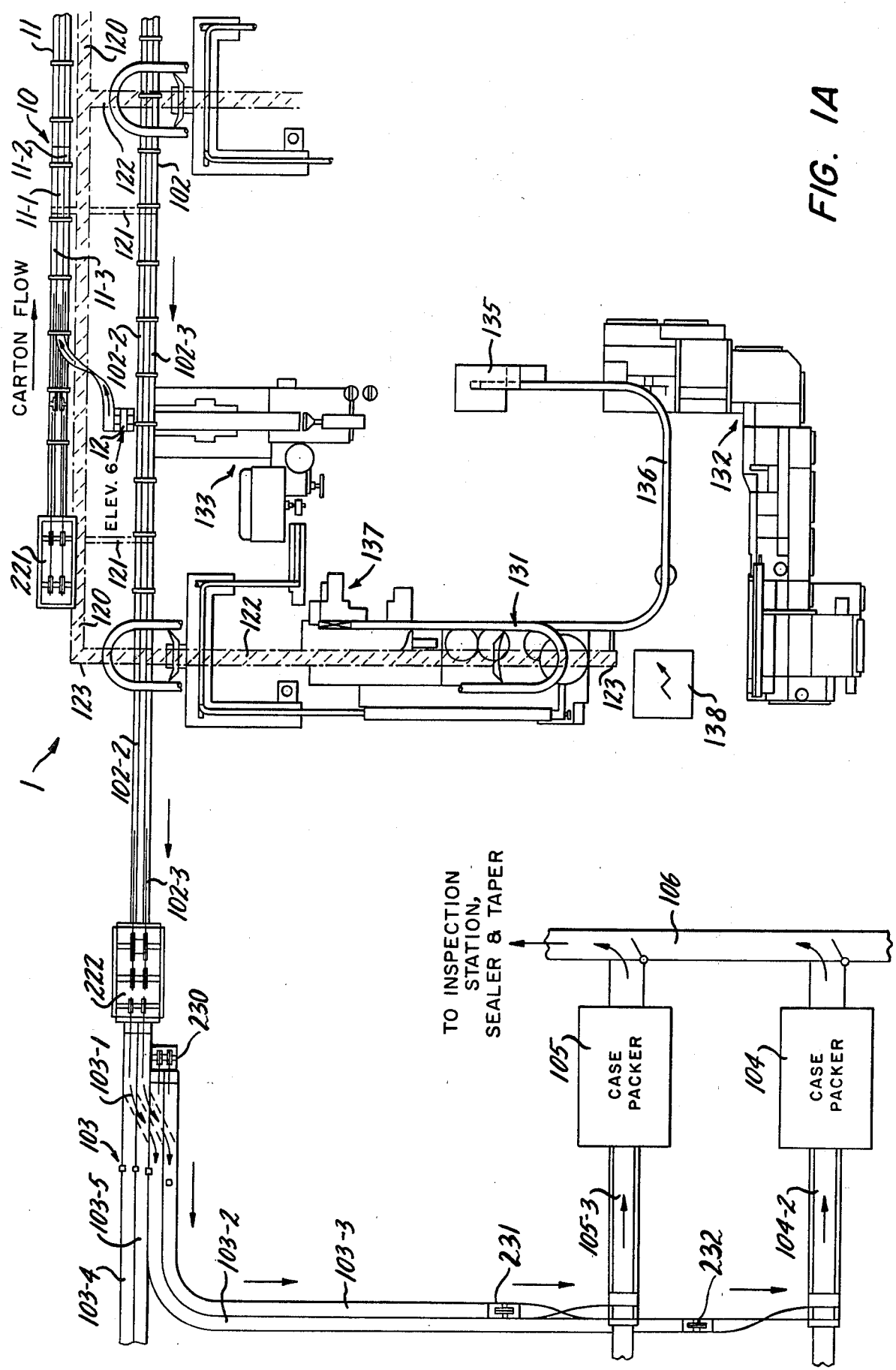
FIGS. 1A–1B illustrate a cigarette carton packaging system utilizing modular conveyor guides in accordance with the principles of the present invention.
Figure 1B:
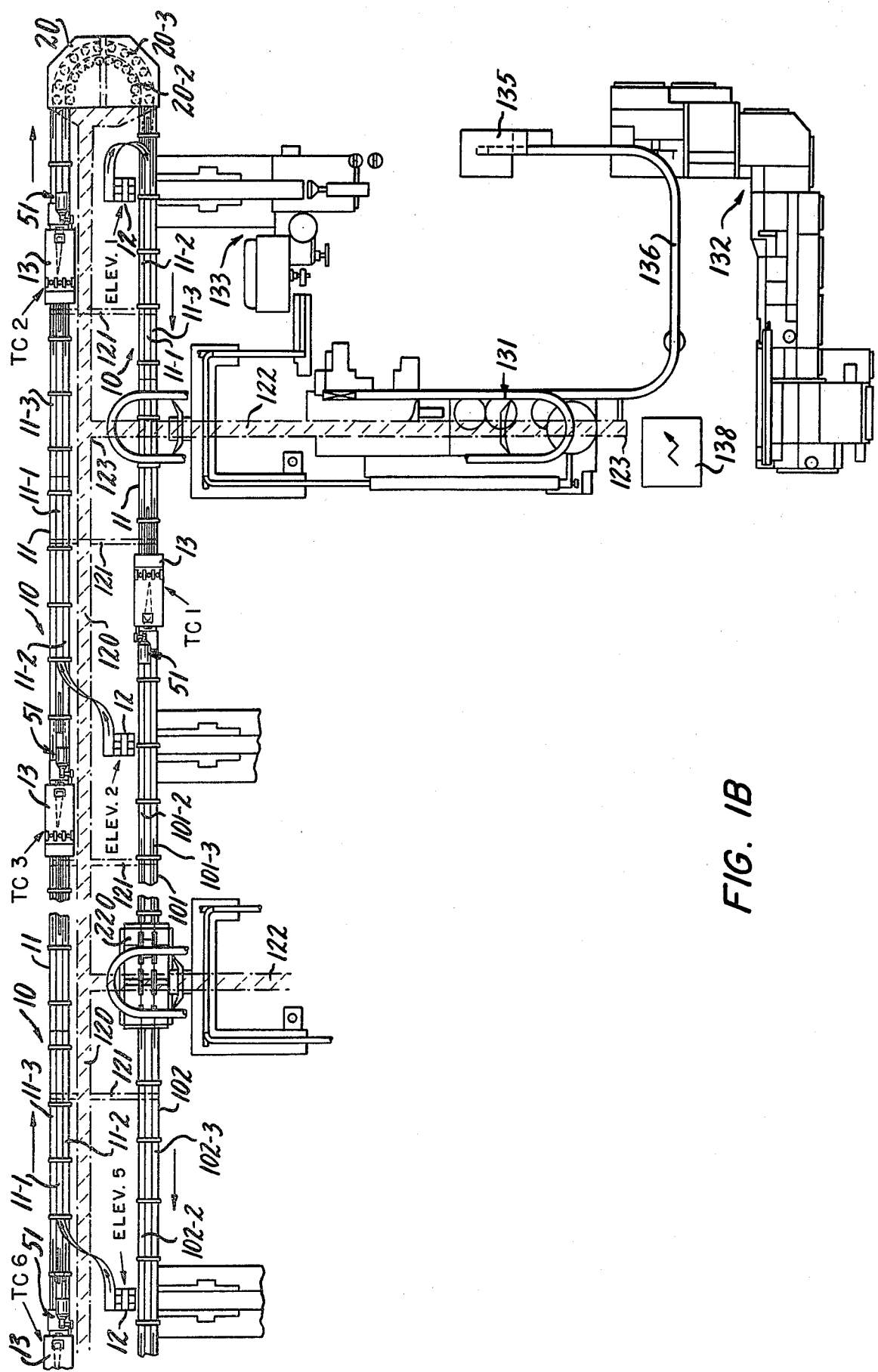
Figure 2B:
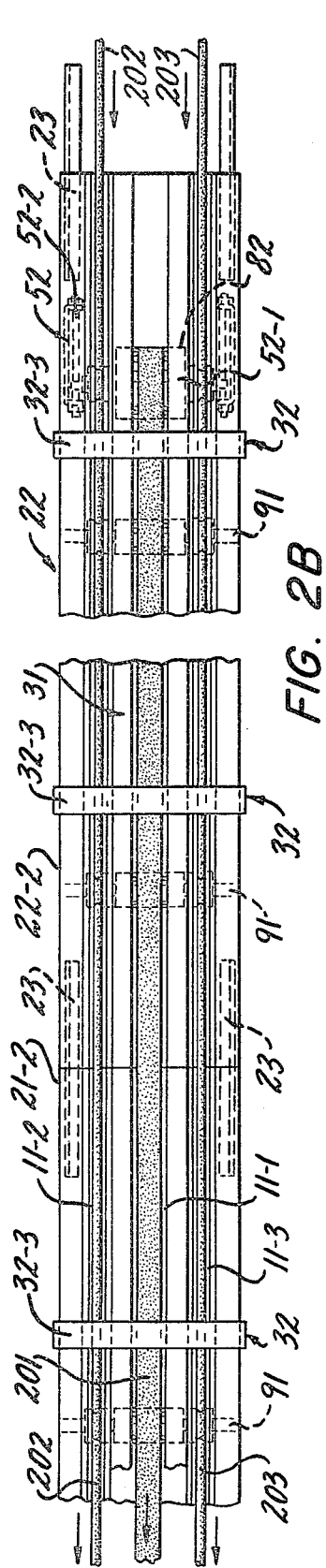
Figure 3B:
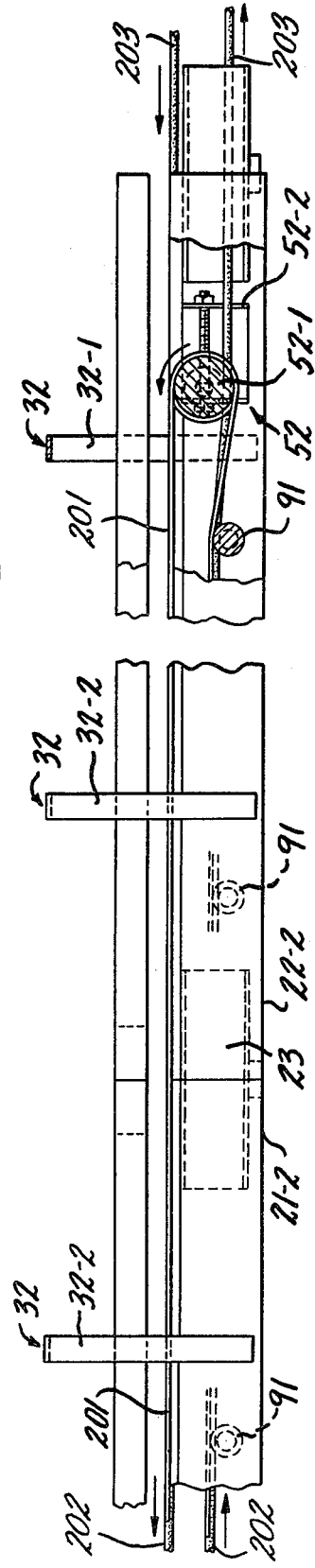
Figure 4B:
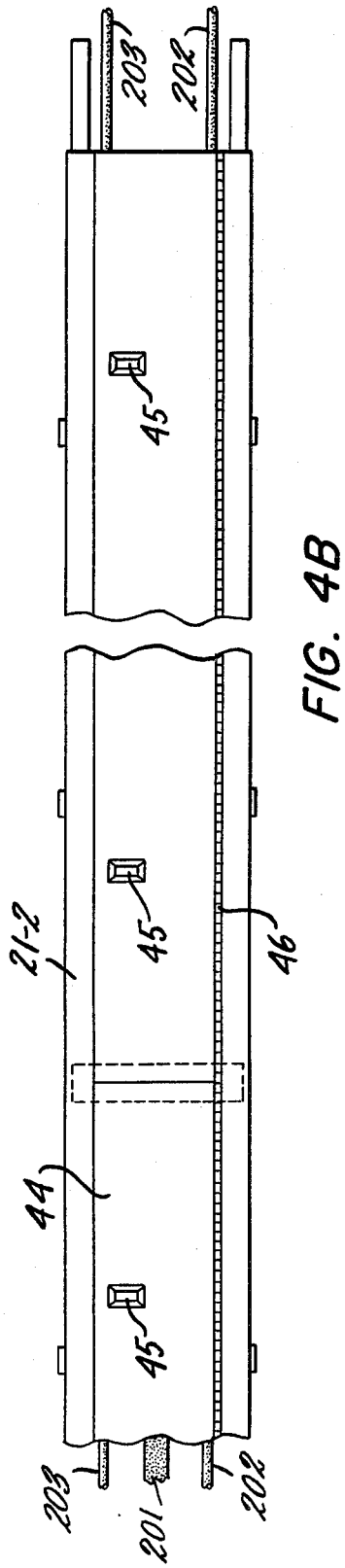

FIGS. 1A and 1B illustrate a cigarette carton packaging system 1 including a plurality of serially arranged modular conveyor guides 10 in accordance with the principles of the present invention. The modular guides 10 are of similar construction and each includes a guide segment or track 11 which defines first, second and third carton conveyance channels 11-1, 11-2 and 11-3. An elevator 12 of the modular guide delivers cartons to the first channel 11-1 (central channel) of the track 11, while cartons are delivered to the channels 11-2 and 11-3 (side channels) from the corresponding side channels 11-2 and 11-3 of the previous modular guide.

Downstream of the elevator, each modular guide is provided with a traffic or carton controller 13 which diverts the cartons in the central channel 11-1 to either one of the side channels 11-2 and 11-3. Cartons thus exit from each modular guide via one or the other side channels 11-2 and 11-3 and, in turn, are delivered to the corresponding side channels of the next guide conveyor in the tandem arrangement.

In the present illustrative case, the cartons exiting from the forwardmost modular conveyor guide are delivered to an exit track 101 which is of substantially similar construction as the tracks 11. The cartons in the track 101 are thus in either one or the other of the track 101 side channels 101-2 and 101-3, these side channels being in communication with the side channels 11-2 and 11-3 of the forwardmost conveyor guide. A further track 102 similar to and forward of the track 101 receives cartons on its respective side channels 102-2 and 102-3 from the channels 101-2 and 101-3 and delivers these cartons to a table top chain conveyor assembly having four independently driven chain conveyors 103-2 to 103-5.

A diverter mechanism 103-1 diverts the cartons delivered by the channels 102-2 and 102-3 to the chain conveyors 103-2 and 103-3. These conveyors, in turn, deliver the cartons to the infeed assemblies 104-2 and 105-3 of case packers 104 and 105. After packing the cartons, the case packers deliver their packed containers to a common conveyor 106 which carries the containers to an inspection station and from there to a sealer and taper.

The divert mechanism 103-1 can also divert the cartons to the further set of chain conveyors 103-4 and 103-5. These conveyors might be used, for example, where the cigarette cartons are to be exported and would normally lead to overwrappers wherein the cartons are overwrapped with a covering such as cellophane. These overwrappers would then deliver the wrapped cartons to the in-feed assemblies 105-3 and 104-2 for packaging by the packers 105 and 104.

In the present illustrative case, the forwardmost modular conveyor guide, the track 101 and a segment of the track 102, are situated in-line and across from the in-line arrangement of the remaining modular conveyor guides. This arrangement is aimed at efficient utilization of space, although an entirely in-line arrangement could also have been used. In order to connect the two in-line sections a 180 degree turnaround track segment 20 is situated between the forwardmost and next to forwardmost conveyor guides. The track segment 20 is of similar configuration as the track segments 11 and includes side channel segments 20-2 and 20-3 which communicate with the channels 10-2 and 10-3 of the conveyor guides.

The tracks 11 of the modular conveyor guides 10 and the tracks 20, 101 and 102 are supported by a central beam 120 which runs adjacent to and substantially the length of the two in-line arrangements. Supports 121 disposed transverse to the central beam 120 provide actual connection to the respective tracks. The central beam is itself supported by a plurality of extended cross beams 122 each of which is supported at its opposite ends by columns or posts 123. Each cross beam 122 also supports a so-called "oscar" 131 which is suspended above ground and which serves as a temporary storage unit for cigarettes from a cigarette maker-tipper 132. With this type of support assembly for the tracks 11 and the tracks 20, 101 and 102, only a relatively few columns are situated in the area adjacent the elevators 12, thereby providing ready access to the elevators and track segments. Additionally, simultaneous support is provided for the oscar 131.

Cigarettes are delivered to the oscar 131 via a mass flow elevator 135 and a conveyor 136. The oscar 133, in turn, feeds the cigarettes to a packer 137 controlled by a control unit 138. From packer 137 cigarette packs are delivered to boxerwrapper 133 which places the cigarette packs into cartons which are then fed to a corresponding elevator 12.

FIGS. 2A, 2B, 3A, 3B, 4A, 4B and 5 illustrate in more detail the track 11 and its associated equipment including traffic controller 13. The track 11 comprises front and rear extruded track segments 21 and 22 which together with the track rail system 31 define the conveyance channels 11-1 to 11-3. The track segments 21 and 22 are of like construction except for modifications at their extreme opposite ends 21-1 and 22-1. At the end 21-1, segment 21 is adapted to support the traffic controller 13, as well as a conveyor drive assembly 51. The end 22-1, in turn, of segment 22 supports a belt take-up assembly 52 which cooperates with the drive assembly 51, as will be explained in greater detail below. Adjacent ends 21-2 and 22-2 of the track segments are bolted as by plates 23 to form the composite track 11. Similar plates are used to bolt the ends 21-1 and 22-1 to the ends 22-1 and 21-1 of succeeding and preceding tracks 11.

Figure 5:
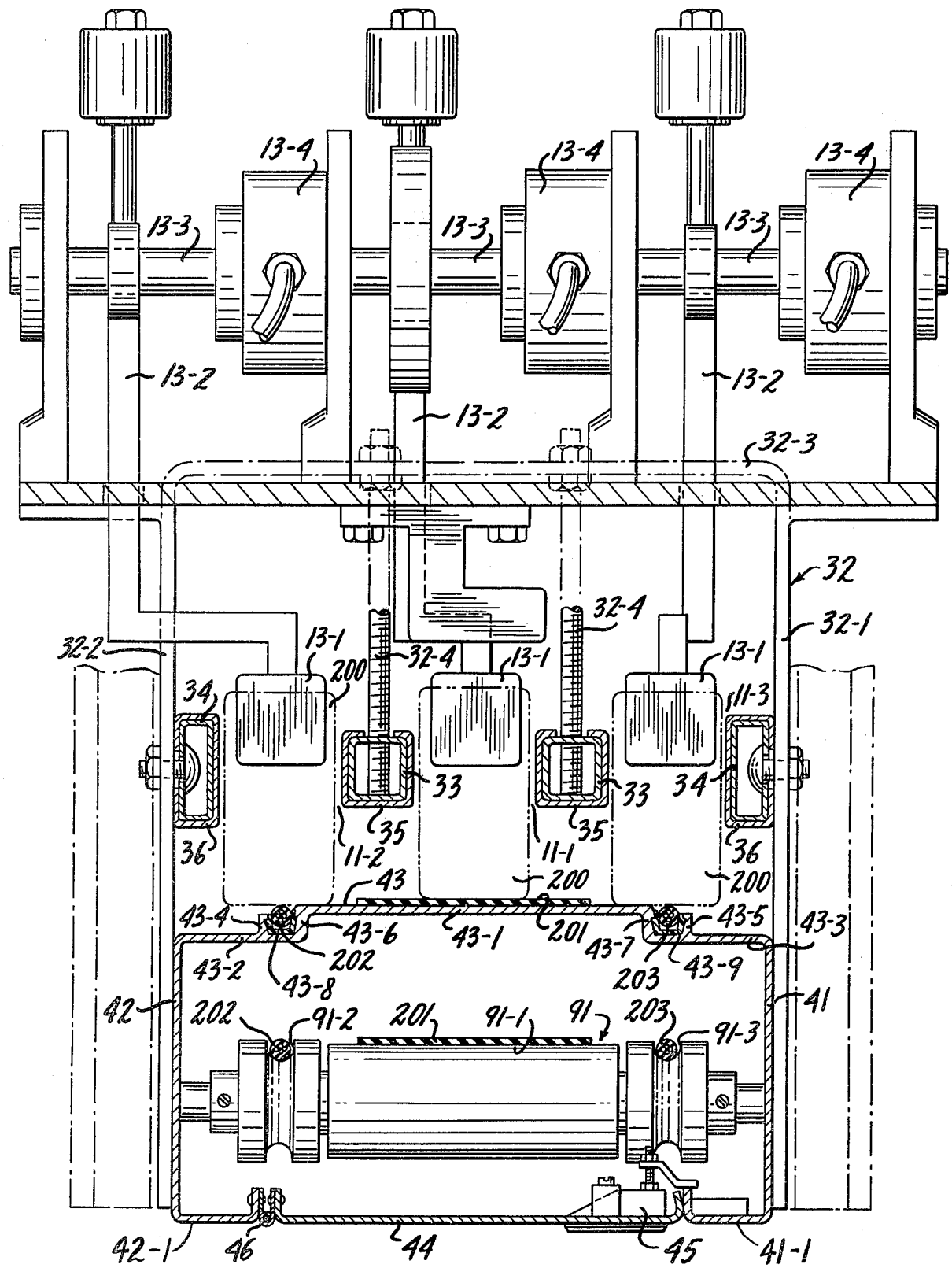
FIG. 5 shows a cross-section taken along the line 5—5 of FIG. 3A.

As shown more clearly in FIG. 5, the extruded track segments 21 and 22 each comprise first and second side walls 41 and 42 and a connecting top wall 43. The top wall 43 is segmented into first, second and third regions 43-1, 43-2 and 43-3. These regions serve as conveyor guides and are adapted to support individual conveyors for transporting cartons 200. In particular, the central region 43-1 is flat and supports passage of a flat belt conveyor 201, while the side regions 43-2 and 43-3 are provided with upstanding flanges 43-4 and 43-5 which cooperate with connecting segments or flanges 43-6 and 43-7 to form conveyor guides for passage of nylon encapsulated cable conveyors 202 and 203. Plastic inserts 43-8 and 43-9 are seated in the flanged areas to prevent wear and permit ready passage of the conveyors 202 and 203.

The side walls 41 and 42 further support the rail system 31 which, as shown in FIGS. 2A, 2B, 3A and 3B, extends substantially the length of the track segments 21 and 22. More particularly, the rail system 31 includes a plurality of support brackets 32 distributed along the length of the segments 21 and 22 and having upstanding legs 32-1 and 32-2 affixed to the side walls 41 and 42 as by bolting. A transverse brace member 32-3 connects the legs 32-1 and 32-2 and holds support bars 32-4 which extend downwardly toward the wall 43. Attached to bars 32-4, are rails 33 which extend along the length of the segments 21 and 22. Further rails 34 are affixed to the members 32-1 and 32-2 and similarly extend along the length of the track segments. Nylon covers 35 and 36 encase the rails 33 and 34 to prevent wear.

As can be appreciated, the rails 33 and 34, along with the wall regions 43-1 and 43-3 and the respective conveyors 201-203 define the carton conveyance channels 11-1 to 11-3. As can be seen in FIG. 5, the cartons 200 in the side channels 11-2 and 11-3 are actually supported by the cable conveyors 202 and 203 and by respective end segments of the region 43-1. This provides added stability for the cartons. It also helps to reduce the total expanse required of the wall 43 beyond that already realized by conveying the cigarette cartons along their narrowest wall, i.e., the wall defined by their width and length dimensions.

As stated previously, movement or passage of cartons from the central channel 11-1 to the side channels 11-2 and 11-3 of the track segment 11 is controlled by traffic controller 13 supported at the end 21-1 of the respective front track segment 21. As seen in FIG. 5, traffic controller 13 includes stop members 13-1 each situated in a different one of the channels 11-1 to 11-3 so as to confront the cartons conveyed therein. These stop members are carried by counterbalanced arms 13-2 supported on rotatable shafts 13-3 which can be locked in position by electrically actuatable brake assemblies 13-4. Such locking causes the corresponding stop member 13-1 to be locked in stopping position thereby inhibiting carton movement in the respective channel.

The traffic controller 13 also includes forward of the stop member arrangement (see FIGS. 2A and 3A) a carton divert arm 13-5 rotatable about a vertical shaft 13-6 and used to divert cartons from the central control 11-1 to either side channel 11-2 and 11-3 via its relative position. This is made possible by providing a gap in the rails 33 in the region of the divert arm 13-5 so as to permit communication between the central channel 11-1 and the side channels 11-2 and 11-3 and thereby carton flow therebetween. Arm 13-5 is rotatable via an electrically actuatable motor assembly 13-7 and can be moved from a position directing cartons to one side channel to a position directing cartons to the other side channel. In the present illustrative case, the arm is positioned to direct cartons to side channel 11-2.

Once divert arm 13-5 is positioned in its divert position, proximity detectors 13-8 set an electrical control unit 13-9 which controls the brake assemblies 13-4. In particular, these detectors cause the unit to permit uninhibited rotation of the arm 13-2 and, therefore, its associate stop member 13-1, in the channel to which cartons are not being diverted. The unit 13-9 is further set to permit rotation of the other two arms 13-2 and corresponding stop members 13-1 on a first come first serve basis with respect to incoming cartons. Thus, a proximity detector 13-10 associated with one of these arms is set when the arm is rotated by a passing carton. This setting of the proximity detector is communicated to the unit 13-9 which locks via brake assembly 3-4, the other arm, until the carton has passed substantially through the controller. The locked arm is then unlocked and passage is again determined on a first come first serve basis.

As above-mentioned, forward of the traffic controller 13 is a drive assembly 51 for driving the flat belt conveyor 201. This assembly includes a support frame 51-1 and a motor 51-2 affixed thereto for driving a belt 51-4 which, in turn, drives a roller 51-3. The latter roller is supported between walls 41 and 42 and under wall 43 of the front track segment 21. It receives the belt 201 via a slot 81 situated in the wall region 43-1 just beyond the forward end of the arm 13-5. The drive assembly 51 cooperates with a take-up assembly 52 (see, FIGS. 2B and 3B) located at the end 22-1 of the track segment 22. Take-up assembly 52 includes a large roller 52-1 disposed below wall 43 and supported by a bracket assembly 52-2 for translational movement to adjust the tension in belt 201. A slot 82 in the region wall 43-1 permits the roller 52-1 to deliver belt 201 to the top of the wall to region for carton conveyance.

Distributed along the length of the track segments 21 and 22 below the wall 43 are support rollers 91 which support the belt 201 in its return trip to the take-up assembly 51. As can be seen more clearly in FIG. 5, each support roller 91 includes a flat central region 91-1 for support of the belt 201 and two grooved side regions 91-2 and 91-3 for support of the cable conveyors 202 and 203 in their return passage 22 to their respective take-up assemblies. Similar grooved regions are provided in the rollers 51-3 and 52-1 to maintain alignment of the cable conveyors in passing thereby.

To isolate the drive and take-up rollers 51-3 and 52-1 and the return rollers from the outside environment, each of the track segments 21 and 22 is further provided with a bottom wall or cover 44 (see, FIG. 5) which is hinged by a hinge 46 to a bottom extension segment 42-1 of the side wall 42. A latch assembly 45 permits opening and closing of the bottom wall 44 via disengagement and engagement with a bottom extension segment 41-1 of the side wall 41.

The cable conveyors 202 and 203 are strung through the track segments 21 and 22 of the tracks 11 and similarly through the track 101 to a drive assembly 220 situtated at the forward end of the latter track. This drive assembly can be seen in FIG. 1B and provides independent drive for each cable conveyor. A take-up assembly 221 for the cable conveyors is located upstream of the last modular conveyor guide and is adjusted to provide proper tensioning of the cables.

Similar cable conveyors are strung along the track 102. A further drive assembly 222 at the front end of the track provides independent drive for these cables. A take-up assembly located in the housing for drive assembly 220 cooperates with the drive assembly 222.

Figure 6:
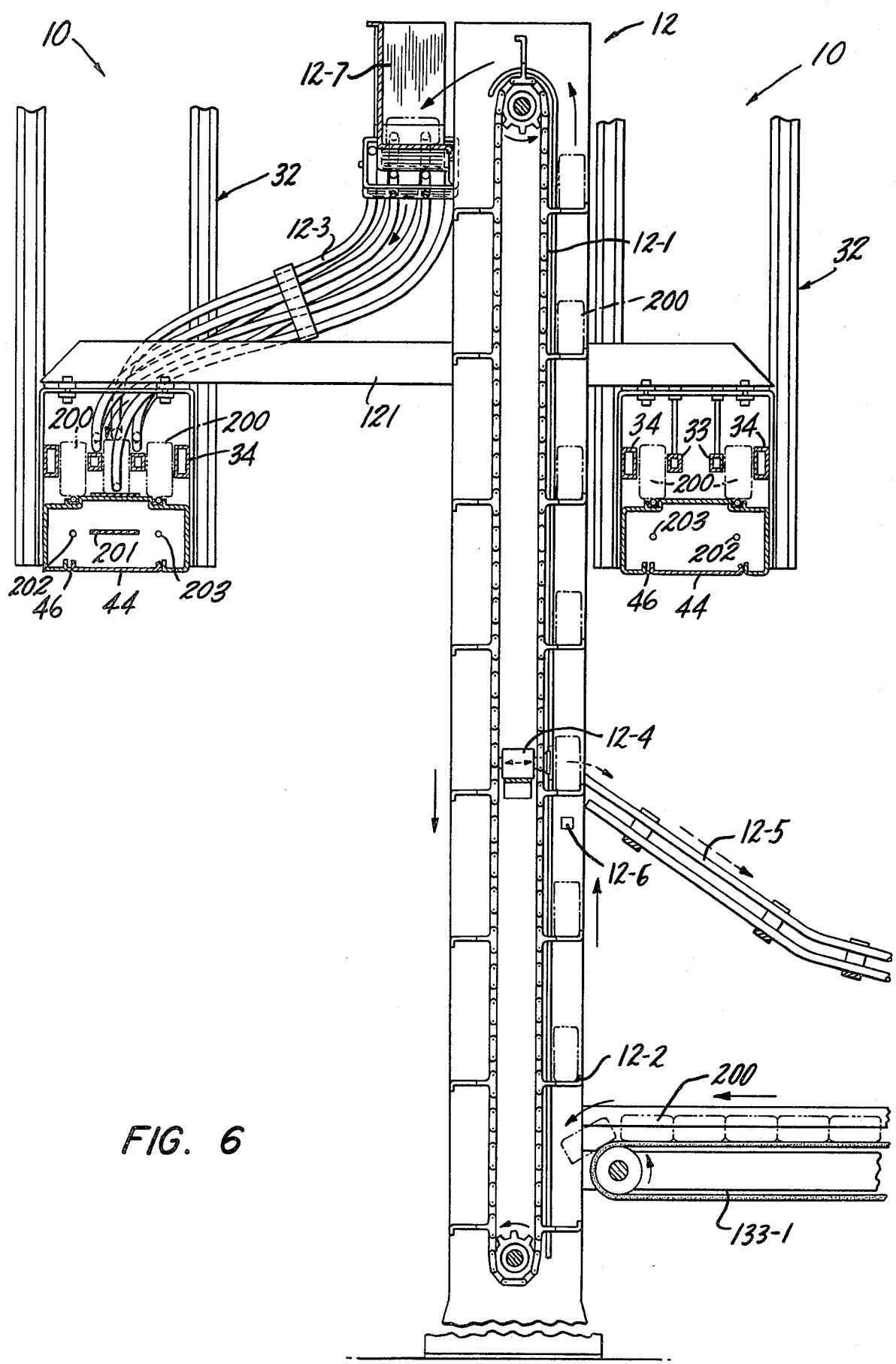
FIG. 6 shows an elevator of the modular guides of FIG. 1.

As above-mentioned, each conveyor guide assembly 10 includes an elevator 12 for conveying the cartons from the boxer-wrapper 133 to the central channel of the respective conveyor guide. FIG. 6 shows details of the elevator 12. A conveyor 12-1 having support plates 12-2 receives cigarette cartons 200 from the discharge conveyor 133-1 of the boxer-wrapper 133. The conveyor 12-1 brings each carton to a top chute 12-7 having a discharge rod assembly 12-3 which positions the carton in the appropriate way upon delivery to the central channel 11-1 of the conveyor track 11. The elevator is also provided with a reject arm 12-4 which can move cartons off the plates 12-2 and onto an accumulation platform or rack 12-5 during certain operation of the packaging system. Sensors 12-6 positioned to view the front flaps of the cartons can also operate the reject arm 12-4 when cartons with open flaps are detected in passing the sensors.

Figure 7:
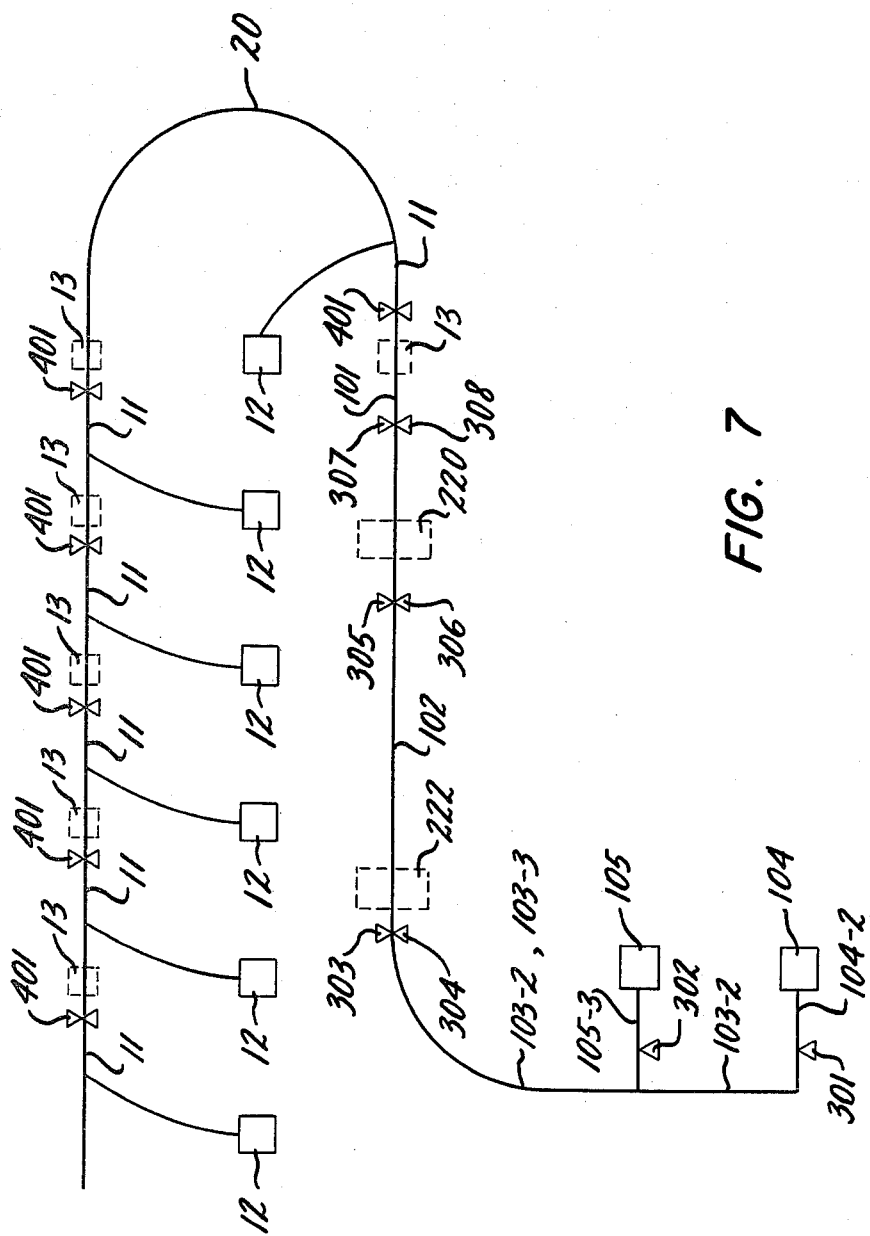
FIG. 7 shows schematically, the location of sensors along the packaging system of FIG. 1.

Operation of the packaging system 1 is controlled by a programmed computer (not shown) and by sensors located in each of the guide conveyor tracks 11 and in the tracks 101, 102 and in the conveyor assembly 103. FIG. 7 shows the relative location of these sensors. More particularly, sensors 301 and 302 sense the accumulation of cartons on in-feed systems 104-2 and 105-3 occasioned by stopping of packers 104 and 105. These sensors control the individual drives 230, 231 and 232 (FIG. 1A) for the respective cable conveyors 103-2 and 103-3 and cause stoppage of these drives when the sensors are blocked by cartons. Further sensors 303 and 304 are disposed in the channels 103-2 and 103-3 forward of the drive 222 to sense carton accumulation in these channels and to stop the respective drives in the assembly 222. Sensors 305 and 306, in turn, sense carton accumulation in the channels 102-2 and 102-3 of the track 102 forward of the drive 220. Another set of sensors 307 and 308 detects accumulation in the channels 101-2 and 101-3 rearward of the drive 220. When corresponding pairs of these latter sensors (i.e. 305 and 307; 306 and 308) become blocked, the associated cable drive in the assembly 220 is stopped and the associated controllers (i.e., those whose central channels feed corresponding side channels) cause blocking of their central channels. Thus, if both the sensors 305 and 307 become blocked, the drive for channel 101-2 and corresponding channels 11-2 will be stopped. Also the controllers 13 set to divert cartons from their central channel to channel 11-2 will have such central channel blocked via locking of the controller arm 13-2 and stop member 13-1. Finally, further sensors 401 are provided in the central channel of each track 11. These sensors upon carton accumulation thereto cause operation of their respective reject arms 12-4 and stoppage of their respective drives 51.

Operation of the system is dependent upon the particular application which dictates the programming for the computer control system and how the system responds to the signals from the system sensors to control the drive 220, the controllers 13, the drives 51 and the reject arms 12-4. In general, the control system is programmed to minimize system down-time by providing maximum accumulation consistent with maintenance of carton integrity during stoppage or jamming of a system case packer. Typical system operation for the case of independent operation of the respective side channels (this will normally be the case where different cigarette brands are delivered in the respective side channels) might typically be as follows.

Assume that for some reason (i.e., jamming, etc.) the case packer 105 should cease to operate. This causes a build-up of cartons on the packer in-feed system 105-3 until the position of the sensor 302 is reached. At this point, the sensor 302 shuts off the drive for the conveyor 103-3 and cartons accumulate on the conveyor 103-3 until the sensor 304 is covered. At this time the drive 222 for the cable conveyor of the channel 102-3 is shut off. Cartons now accumulate in the channel 102-3 and the channel 101-3 until both the sensors 306 and 308 become blocked. This causes locking of the central stop members in the controllers 13 whose central channels feed the side channels 11-3. The central channels 11-1 associated with these controllers then accumulate cartons being delivered by the respective elevators 12. This accumulation continues until the sensors 401 in each central channel are covered at which time the drives 51 for the belt conveyors are stopped, while the reject arms 12-4 on the corresponding elevators 12 are actuated causing cartons to now be delivered to the racks 12-5. As soon as the failure to the packer 105 is cleared the system returns to its original normal operation so as to continue to deliver cartons to the two packers. Failure of the packer 104 would result in an analagous operation of the components associated with that packer.

Where dependent operation of the side channels is desired (this might occur where both case packers are receiving the same brand of cigarette), the aforesaid operation might be modified by causing the controllers 13 associated with the stopped packer to now divert cartons to the side channel feeding the operating packer. In such case, use of both side channels is maintained and system operation is held close to that realized with two operational packers.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. Apparatus comprising a modular conveyor guide including:
   first and second spaced end walls;
   a third wall connecting said first and second end walls, said third wall having a first region for guiding a first conveyor and second and third regions on opposite sides of said first region for guiding second and third conveyors;
   said first region being adapted to guide a flat conveyor;
   said second and third regions being adapted to guide cable conveyors;
   said second region including first and second upstanding flanges spaced to receive a cable conveyor;
   said third region including third and fourth upstanding flanges spaced to receive a cable conveyor;
   said first, second and third walls and said first, second, third and fourth flanges forming an integral track segment formed by extrusion;
   said first region having an upper flat surface for receiving said flat conveyor, said upper flat surface defining the uppermost extent of said extruded track segment between said first and second flanges and said third and fourth flanges.

2. Apparatus in accordance with claim 1 wherein:
   the ends of said first and second end walls include means for connecting said end walls to the end walls of a further modular conveyor guide.

3. Apparatus in accordance with claim 1 wherein:

said first region is at a different elevation than said second and third regions and includes first and second end segments connected to said second and third regions, said first end segment forming said first upstanding flange and said second end segment forming said third upstanding flange.

4. Apparatus in accordance with claim 1 wherein:
said modular conveyor guide further comprises:
means connected between said first and second end walls below said third wall for supporting said first, second and third conveyors.

5. Apparatus in accordance with claim 4 wherein:
said conveyor support means comprises:
a number of elements distributed along the length of said first and second walls and rotatably connected therebetween, each said element including a central region for guiding said first conveyor and laterally disposed regions for guiding said second and third conveyors.

6. Apparatus in accordance with claim 5 wherein:
said laterally disposed regions each include a conveyor receiving grove.

7. Apparatus in accordance with claim 6 wherein:
each said element includes a cylindrical roller forming said central region and cylindrical pulleys forming said lateral regions.

8. Apparatus in accordance with claim 4 wherein:
said modular conveyor guide further includes:
a fourth wall disposed below said conveyor support means and pivotally connected to said second wall.

9. Apparatus in accordance with claim 8 wherein:
said modular conveyor guide further includes:
means attached to said third wall for lockably engaging said fourth wall to inhibit pivoting of said fourth wall.

10. Apparatus in accordance with claim 4 wherein:
said first region has a first slot for passage of said flat conveyor below said third wall to said conveyor support means.

11. Apparatus in accordance with claim 10 wherein:
said modular conveyor guide further includes:
a flat conveyor take-up assembly supported between said first and second walls so as to communicate with said first slot for directing said flat conveyor between said first region and said conveyor support means.

12. Apparatus in accordance with claim 11 wherein:
said first region has a second slot for passage of said flat conveyor between said conveyor support means to said first region;
and said modular conveyor guide further includes:
a flat conveyor drive assembly supported by said first and second walls so as to communicate with said second slot for directing said flat conveyor between said support means and said first region.

13. Apparatus in accordance with claim 12 wherein:
said take-up assembly includes a take-up roller translationally movably mounted between said first and second end walls and having a central cylindrical region extending adjacent said first slot for receiving said flat conveyor and lateral cylindrical grooved regions of lesser diameter than said central region for receiving said cable conveyors;
and said drive assembly includes: a drive roller mounted between said first and second end walls below said second slot and having a central cylindrical region extending adjacent said slot for receiving said first conveyor and lateral cylindrical grooved regions of lesser diameter than said central region for receiving said cable conveyors.

14. Apparatus in accordance with claim 13 wherein:
said drive assembly further includes: a motor for driving said drive roller and means for mounting said motor to said first and second end walls.

15. Apparatus in accordance with claim 1 wherein:
said modular conveyor guide further comprises:
rail means situated along the expanse of said third wall for cooperating with said first, second and third regions to define corresponding first second and third channels for conveyance of articles.

16. Apparatus in accordance with claim 15 wherein:
the expanse of each of said first, second and third channels is sufficient to allow passage of a cigarette carton.

17. Apparatus in accordance with claim 16 wherein:
the expanse of each said first, second and third channels is greater than the smallest dimension of a cigarette carton and less than the next smallest dimension of said carton.

18. Apparatus in accordance with claim 17 wherein:
said smallest dimension is approximately equal to the thickness of the two cigarette packs.

19. Apparatus in accordance with claim 16 wherein:
said rail means includes:
a number of support brackets affixed to said first and second walls and extending over said third wall;
first, second, third and fourth elongated rail members affixed to said support brackets and spaced across the expanse of said third wall, said first and second rail members cooperating with at least said second region to define said second carton conveyance channel, said second and third rails cooperating with said first region to define said first carton conveyance channel and said third and fourth rails cooperating with at least said third region to define said third carton conveyance channel.

20. Apparatus in accordance with claim 19 wherein:
said first and second rails cooperate with said first and second regions to define said second channel;
and said third and fourth rails cooperate with said first and third regions to define said third channel.

21. Apparatus in accordance with claim 19 wherein:
each said bracket has first and second courses extending upward from said first and second walls and a third course connecting said first and second courses;
said second and third rails are suspended from said third course;
and said first and fourth rails are connected to the sides of said first and second courses.

22. Apparatus in accordance with 15 wherein:
said modular conveyor guide further comprises:
control means controlling the passage of articles through said channels and from one of said channels to the other of said channels.

23. Apparatus in accordance with claim 22 wherein:
said article control means diverts articles in said first channel to one of said second and third channels.

24. Apparatus in accordance with claim 23 wherein:
said article control means includes:
first, second and third rotable stop members arranged in said first, second and third channels to engage the articles moving therein;
and a diverter forward of said stop members in said first channel to divert articles in said first channel to one of said second and third channels;

and said rail means defines said first, second and third channels to be in communication in the region of said first channel occupied by said diverter.

25. Apparatus in accordance with claim 23 wherein: said modular conveyor guide further includes:

flat conveyor drive and take-up assembles arranged along the length of said third wall for driving said flat conveyor along the length of said first region and returning said flat conveyor to the beginning of said region;

and said article control means is disposed along said first region between said drive and take-up assembles.

26. Apparatus in accordance with claim 25 wherein: said modular conveyor guide further comprises:
an elevator means for receiving said articles and for conveying said articles to said first channel rearward of said article control means.

27. Apparatus in accordance with claim 26 wherein: said modular conveyor guide further comprises:
a first sensor for sensing when the articles in said first channel accumulate to a preselected point in said channel;
and means responsive to said first sensor for shutting off said flat conveyor drive assembly.

28. Apparatus in accordance with claim 27 wherein: said elevator means includes:
an article accumulation rack;
and a divert means for diverting articles to said rack;
and said control means causes operation of said divert means in response to said first sensor.

29. Apparatus in accordance with claim 27 further comprising:
a number of further modular conveyor guides said modular conveyor guide and further modular conveyor guides being connected in tandem so that the first, second and third channels of each guide are aligned with the respective first, second and third channels of the immediately preceding and immediately succeeding modular conveyor guide.

30. Apparatus in accordance with claim 29 further comprising:
cable conveyor drive and take-up assembles for driving said first and second cable conveyors guided by said second and third regions of said modular conveyor guides.

31. Apparatus in accordance with claim 30 wherein: said cable conveyor drive assembly is disposed forward of the first modular conveyor guide in said tandem connection of modular conveyor guides;
and said cable conveyor take-up assembly is disposed rearward of the last modular conveyor guide in said tandem connection of modular conveyor guides.

32. Apparatus in accordance with claim 31 further comprising:
track means including fourth and fifth channels for conveying said articles from the second and third channels of said first of said conveyor guides to first and second article packaging stations;
second and third sensors in said fourth channel and said second channel forward of said first conveyor guide for sensing article accumulation;
fourth and fifth sensors in said fifth channel and said third channel forward of said first conveyor guide for sensing article accumulation;
and control means responsive to said second and third sensors for causing said cable conveyor drive to stop the cable conveyor guided by said second channels of said conveyor guides and responsive to said fourth and fifth sensors for causing said cable conveyor drive to stop the cable conveyor guided by said third channels of said conveyor guides.

33. Apparatus in accordance with claim 32 wherein: said further control means in response to said second and third sensors causes each article control means passing articles from a first channel to a second channel to inhibit such passage and in response to said fourth and fifth sensors causes each article control means passing articles from a first channel to a third channel to inhibit such passage.

34. Apparatus in accordance with claim 33 further comprising:
additional drive and take-up assemblies for driving conveyors guided in the fourth and fifth channels of said track means.

35. Apparatus in accordance with claim 34 further comprising:
sixth and seventh sensors for sensing the accumulation of articles in said fourth and fifth channels of said track means;
and further control means responsive to said sixth sensor for causing said additional drive assembly to stop the conveyor guided by said fourth channel and responsive to said sixth sensor for causing said additional drive assembly to stop the conveyor guided by said fifth channel.

36. Apparatus in accordance with claim 35 further comprising:
computer means for controlling said control and further control means and said means in each conveyor guide responsive to said first sensor of that conveyor guide.

37. Apparatus in accordance with claim 29 further including:
a beam extending along the length of said tandem connection of modular guides;
posts distributed along the length of said beam for supporting said beam;
and means for coupling at least one of said first and second end walls of each modular conveyor guide to said beam.

38. Apparatus in accordance with claim 37 wherein: said coupling means includes a plurality of supports connected to and extending transverse of said beam.

39. Apparatus in accordance with claim 37 further including:
track means for conveying said articles from the second and third channels of said first of said conveyor guides to an article packing station;
a portion of said track means being coupled by said coupling means to said beam.

40. Apparatus in accordance with claim 39 wherein: said portion of track means extends in spaced adjacent relationship to at least a section of said tandem connection of conveyor guides and includes at least one track portion of substantially similar construction as said integral track segment.

41. Apparatus in accordance with claim 37 wherein: said articles are cigarette cartons,
and said apparatus further includes:
cross-beams each having end connected to a different one of said posts;
columns each connected to the other end of a different one of said cross-beams;

and cigarette storage units each suspended from a different one of said cross-beams.

42. Apparatus in accordance with claim 25 wherein:
said first, second and third walls comprise first and second of said track segments, said first track segment having first and second end regions and said second track segment having third and fourth end regions; said second end region being connected to said third end region;
and said flat conveyor drive assembly and said article control means being disposed at said first end region and said flat conveyor take up assembly being disposed at said fourth end region.

43. Apparatus in accordance with claim 15 wherein:
said rail means cooperates with said first and second regions to define said second channel and with said first and third regions to define said third channel.

* * * * *